United States Patent Office 3,533,918
Patented Oct. 13, 1970

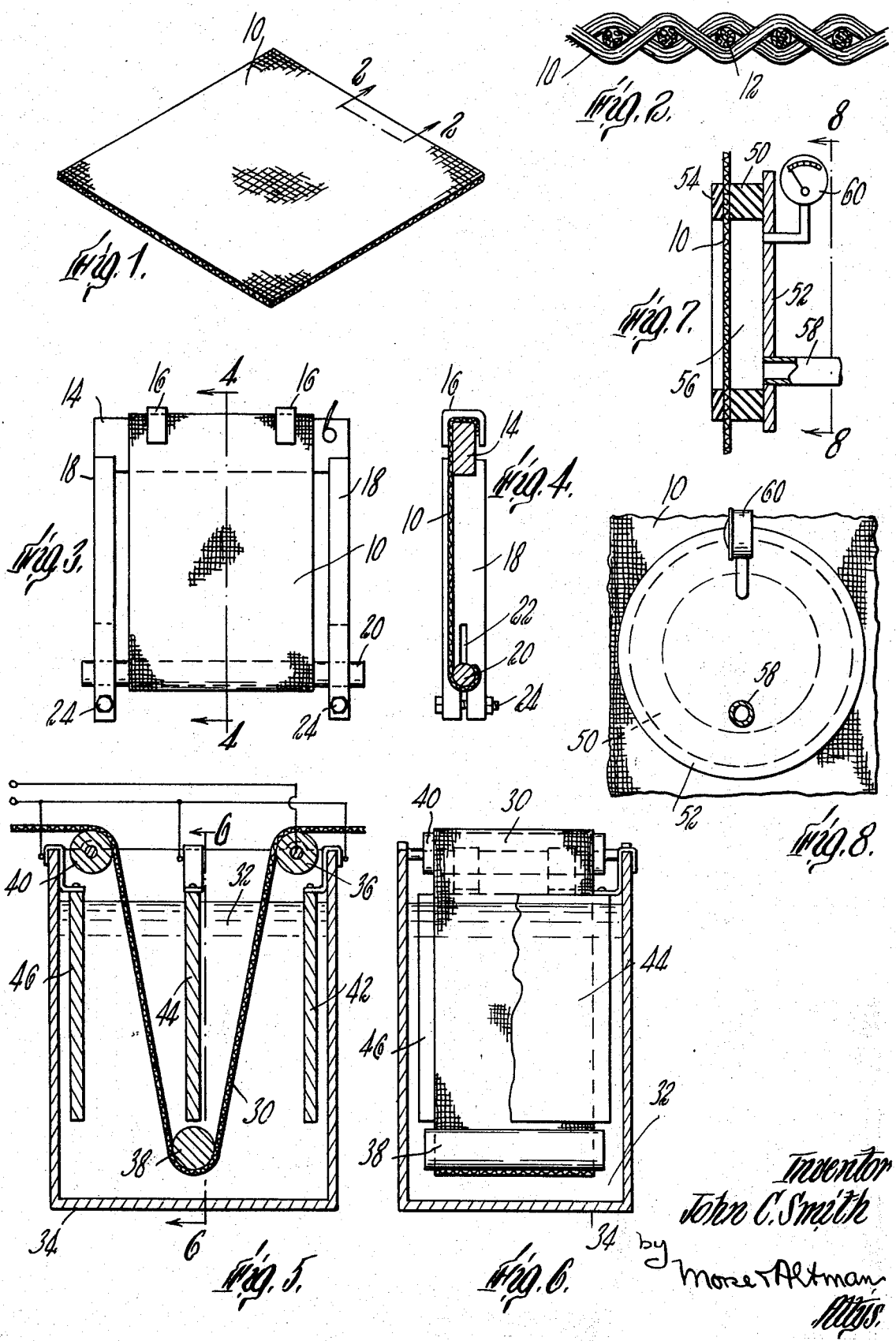

3,533,918
**METHOD OF MAKING ELECTRODES
FOR FUEL CELLS**
John C. Smith, 16 Ivy Place, Upper
Saddle River, N.J. 07458
Continuation-in-part of application Ser. No. 281,144,
May 17, 1963. This application Apr. 18, 1967, Ser.
No. 633,672
Int. Cl. C23b 5/60
U.S. Cl. 204—30                                      7 Claims

ABSTRACT OF THE DISCLOSURE

An electrode for a fuel cell is made by forming a thin film of a metal sulphide having a high specific electrical conductivity on non-conducting material such as nylon or glass, without the use of compounds of silver, gold, platinum or palladium for sensitizing or otherwise, by a two-step method consisting or (1) wetting the material with an aqueous solution of a soluble chloride salt of a metal of the iron family and (2) converting the chloride salt on the material to the corresponding sulphide. The material can then be electrolytically metal-plated.

---

This application is a continuation-in-part of my pending application Ser. No. 281,144, filed May 17, 1963, for Method of Making Electrodes for Fuel Cells, and later abandoned. The invention relates to the achievement of electrically conductive coatings on surfaces of non-conducting materials such, for example, as nylon or glass. While one of the aplications of this invention is in the fabrication of fuel cell electrodes, as hereinafter described, the advantages obtained are also applicable to other processes involving the plating of non-conductive material.

Although means of metal-plating non-conductive materials exist, these existing means are plagued with practical difficulties such that their utilization for large-scale production applications is severely limited. In general, these existing means involve the reduction of a metal salt or compound to *elemental metal*. The reduction of salts of noble metals such as gold, platinum, palladium, or silver, to the elemental metal can be accomplished, as is well known to those skilled in the art. However, the extremely high cost of these materials precludes their use in large-scale commercial applications.

The reduction of non-noble metals such as copper to the elemental metal can also be accomplished, with difficulty, if proper sensitizing and precise control of ingredients, concentration, solution pH, temperature, and timing are provided. However, such precise control over a large area and on a reliable, continuous basis is difficult. Consequently, local areas may exist where one or more of the required precise control requirements is not fully met, and a blemish, or unplatable area, results. In general, the reduction of a non-noble metallic compound to elemental metal over a large surface area with the complete freedom from local flaws necessary for subsequent satisfactory electro-plating is possible only with meticulous preparation of the surface to be coated with regard to cleansing, sensitizing or catalyzing. Furthermore, the sensitizing or catalyzing step, in addition to the obvious complication, usually requires employment of a compound of one of the aforementioned expensive, noble metals. In contrast, the invention hereinafter disclosed intentionally avoids reduction to elemental metal and relies instead on conversion of a water-soluble metallic salt to a water-insoluble conductive metal sulphide, there by eliminating the need for use of high-cost, noble metals for sensitizing or otherwise, eliminating the need for meticulous surface preparation, or sensitizing, or catalyzing, and providing a simple, *two-step-only* process which utilizes *only low-cost* materials and is readily adaptable to commercial, large-scale production of large areas at very low cost.

One practical example of the utility of the invention lies in the manufacture of electrodes for electrolytic cells such as fuel cells, especially of the hydrogen-oxygen type wherein hydrogen or a compound thereof is combined with oxygen or an oxidant to produce electric current with water as a by-product. One of the problems involved in the production of a commercially useful cell or battery of cells is the provision of an electrode which has a large surface area for contact by the electrolyte and by the fuel or the oxidant, but which is small in weight and volume. It is an object of the invention to provide such an electrode which is durable, relatively inexpensive, and efficient. For this purpose a woven fabric is employed, preferably consisting of bundles of fine fibers, which may be nylon or glass, individually coated with metal by a novel process to make the surface of the fabric electrically conductive. The large total exposed surface area of the fabric is due to its multi-fibrous structure. The high efficiency results from this large exposed area, and from the fact that the porosity, that is, the interfiber interstices, can be controlled in the plating process as hereinafter described.

The use of nylon or glass as a substrate involves the devising of a commercially operable method of electrically metal-plating an electrically non-conductive surface. This is done quickly, easily and economically, as hereinafter described, using low-cost materials. In brief, the non-conducting surface is wetted with a solution of nickel chloride which is instantly converted to a nickel sulphide coating by the application of an alkali sulphide. The surface can then be metal-plated electrolytically.

Since the degree of porosity of an electrode is of great importance, a simple apparatus for testing the porosity of the electrode during and after fabrication is illustrated and described.

For a more complete understanding of the invention reference may be had to the following description thereof, and to the drawing, of which FIG. 1 is a perspective view of a piece of cloth woven of, for instance, yarns consisting of nylon or glass fibers;

FIG. 2 is an enlarged sectional view taken on the line 2—2 of FIG 1;

FIG. 3 is an elevational view of a frame on which a piece of woven fabric is held under tension;

FIG. 4 is a section on the line 4—4 of FIG. 3;

FIG. 5 is a sectional view of electro-plating apparatus with a fabric sheet being drawn through it;

FIG. 6 is a section on the line 6—6 of FIG. 5;

FIG. 7 is a sectional view of apparatus for testing the porosity of a piece of fabric; and FIG. 8 is an elevational view of the same.

A piece of woven fabric 10 is shown in FIG. 1, the material being preferably nylon or glass cloth the warp and weft yarns of which are wholly or partly composed of bundles of very fine filaments 12, each filament having a diameter of .0001″ or so. The large number of filaments in each yarn gives the yarn a large aggregate surface area in comparison with its bulk. This is an important characteristic of the cloth, as well as its mechanical strength, but nylon and glass are non-conductors of electricity, so to make the cloth suitable for use as an electrode, a thin adherent plating of metal such as nickel is applied to the individual filaments so as to provide as great a total surface area as possible for contact with the electrolyte when the fabric is employed as an electrode in a fuel cell.

In order to plate an electrically non-conducting material such as the filaments of a glass cloth fabric, a thin coating of an electrically conductive metal sulphide is first formed thereon. For this purpose a sulphide of nickel, iron or cobalt can be employed. A coating of an electrically conductive sulphide, e.g. nickel sulphide, is formed on the filaments as follows.

The cloth is dipped in or otherwise wetted by an aqueous solution of a soluble nickel salt such as the chloride, nitrate or sulphate, the chloride being preferred. For example, a solution of three pounds of nickel chloride per gallon of water is satisfactory. As nickel chloride is also soluble in alcohol, a mixture of water and alcohol can be used to advantage as the solvent, for example, three parts water and one part of a low boiling-point alcohol (i.e. under 100° C.) such as methyl, ethyl or propyl. The alcohol results in a more rapid and thorough penetration of a porous substance such as a glass-cloth fabric. After removal of excess solution and drying or nearly drying, the cloth is treated, by dipping or otherwise, with a solution of an alkali sulphide such as sodium, potassium or ammonium sulphide. This solution may be made by dissolving three ounces of sodium, potassium or ammonium sulphide in one gallon of water. For best results, the solution should be made fresh just prior to using, since gradual conversion of the sulphide to sulphate occurs and the solution is then ineffective for conversion of the metal chloride to metal sulphide. The application of the alkali sulphide results in the instant formation of a coating of nickel sulphide which is exceedingly thin, uniform, adherent to the substrate and water-soluble. The nickel sulphide coating also has a high specific electrical conductivity, its conductivity being more than forty times that of copper sulphide. The specific conductivities of the sulphide of the other members of the iron family, namely, iron and cobalt, are also high though somewhat less than that of nickel sulphide. In lieu of alkali sulphide to produce insoluble nickel sulphide, a solution of sodium thiosulphate may be employed. However, in this case, in order to effect conversion, drying and exposure to heat are required, and the attainment of an electrically-complete, uniform coating is considerably more difficult than with alkali sulphide solution.

The very low electrical resistivity of sulphides of metals of the iron family (iron, cobalt, nickel), particularly nickel, as herein formed, makes possible the use of coatings so thin as to be unmeasurable with an instrument of one ten-thousandth inch sensitivity. In addition, the sulphide coating formed as herein described is extremely penetrative and adherent to the base material. In the case of, for instance, wood or fabric, the appearance of the coated article is very similar to that achieved by immersion in black ink or dye.

Because of the above-described extremely thin coating and tenacious bond, in combination with certain electrochemical phenomena hereinafter described, an extremely tenacious over-all bond is achieved between article and subsequently-deposited electroplated metal. This bond is essentially intermolecular because of the well-known reducing action which occurs at the cathode (electrode connected to negative pole of electrical supply source) during electrolytic processes. That is, an insoluble metallic compound, e.g. an oxide or a sulphide in contact with the cathode, as is the case in electroplating the sulphide-coated article in the process herein disclosed, tends to release its oxygen or sulphur, thereby becoming reduced to elemental metal. In the case of this invention, this elemental metal, intimately-joined on the one side to un-reduced, highly-adherent sulphide or to the article itself in the case of complete reduction of the sulphide, is then intimately joined on the other or outer side to subsequently-electrodeposited additional metal.

In the case of plating of fibrous materials such as, for instance, glass-fiber, or cotton, or nylon cloth for subsequent use as, for example, fuel cell electrodes, the above-described extremely thin sulphide coating and resultant intermolecular-type bond provides a distinct and important advantage over other metallizing processes or prior art. Because of the extremely thin coating thickness and very low electrical resistivity (0.0002 ohm-centimeter in the case of nickel sulphide), each individual fiber of the base material becomes covered with a tenacious coat of electrodeposited metal, thereby providing an electrode with extremely high surface area per unit of geometric volume, a mandatory requirement well known to those schooled in the fuel cell art. This coating of individual fibers has been repeatedly verified by microscopic examination and has also been verified by micro-photography.

The nickel sulphide coating is essentially free from metallic nickel as is evidenced by the complete absence of magnetic tendencies in the coating. When the nickel sulphide coating has been formed, the coated article can then be immersed at once in the electrolyte of a plating bath. A current is then passed through in the usual manner to deposit a very thin plating of metal, such as nickel, on the individual filaments. The plating thus formed on the sulphide layer has a rough irregular surface that acts effectively to promote chemisorption which aids considerably in the attainment of high fuel cell efficiency and electrical output. The electrolyte bath for plating the cloth may be made by dissolving four pounds of nickelous sulphate and two pounds of ammonium chloride in each gallon of water used.

In order to avoid the development of undesirable wrinkles in the fabric when it is being electro-plated, it is maintained under tension while in the bath. If a single piece 10 of cloth is to be plated it may be mounted in a suitable frame such as that illustrated in FIGS. 3 and 4. As therein shown, the frame comprises a top bar 14 to which a margin of the cloth 10 may be secured by clips 16 or otherwise. From the ends of the top bar 14 side members 18 extend downward, the lower portion of each side member having a hole to receive a rod 20. A split 22 in the lower portion of each side member intersects the hole through which the rod 20 extends. The lower end of the piece of cloth 10 is cemented or otherwise secured to the rod 20 which is then turned until sufficient tension is on the cloth, whereupon the rod is pinched by tightening bolts 24 which draw toward each other the jaws formed by the slot 22 in each member 18. The frame with the cloth held thereby under tension can then be immersed in the electrolytic bath.

For a continuous plating operation, a strip 30 of cloth of indeterminate length, which has been treated as hereinbefore described to coat the filaments with an adherent film of sulphide, is drawn through an electrolytic bath 32 in a tank 34 as illustrated in FIGS. 5 and 6. The strip of cloth is drawn from a supply roll (not shown) which is suitably braked to maintain tension on the strip leading to the tank 34. The strip passes over a guide roll 36 then under a second roll 38 near the bottom of the tank, the roll 38 being held down by its own weight or by bearings (not shown) in the tank wall. The strip 30 then moves upward and over a guide roll 40 at the top of the tank and on to a take-up roll (not shown). To ensure uniform penetration of the pores of the cloth by metal ions from the anodes, three nickel anodes 42, 44, 46 may be arranged as indicated, the middle anode 44 being within the loop of cloth formed in the bath by the lower roll 38 under which the cloth passes. If the plating operation is overdone, the increased thickness of the plating will increasingly block the interstices between the filaments and between the yarns. This condition shows up in a progressive decrease in the porosity. To avoid this undesirable condition, the porosity may be tested at intervals during the plating operation, and if porosity decreases to a point below the acceptable minimum, it can readily be restored by reversing the current passed through the plating bath.

A simple but effective apparatus for quickly testing cloth for porosity is illustrated in FIGS. 7 and 8. The piece of cloth to be tested is pressed against a rubberlike gasket 50 which is mounted on a disk 52. An outer gasket 54 is pressed manually or by any suitable clamping means (not shown) on the face of the cloth 10 to register with the gasket 50. When the cloth is firmly pressed between the soft gaskets 50, 54, air is introduced into the chamber 56 between the disk 52 and the cloth 10 through a pipe 10 which leads from a reservoir (not shown) in which a predetermined pressure is maintained, above or below atmospheric pressure. The leakage of air through the pores of the cloth 10 will result in a drop or rise of pressure in the chamber 56, the extent of such drop or rise, which may be indicated by a gauge 60 communicating with the chamber, being a measure of the degree of porosity of the cloth. In this way the porosity of the plated cloth can be closely controlled.

In order to increase the total metal surface available on an electrode, additional metal may be applied by directing a fine spray of molten metal such as nickel against the plated faces of the electrode. The fine droplets stick to the plating and stand out therefrom, thus adding materially to the total metal surface to be wetted by the electrolyte when the electrode is used in a fuel cell.

I claim:
1. A method of plating an electrically nonconductive material which consists of externally applying to the surface of the material a salt of a metal the sulphide of which is highly electrically conductive, then externally applying to said surface a compound capable of converting the said salt to the corresponding sulphide, and electrolytically depositing a metal plating directly on said sulphide coating.

2. A method as claimed in claim 1, said metal sulphide coating being formed by wetting said surface with an aqueous solution of the chloride of said metal and converting the chloride into the corresponding sulphide.

3. A method as claimed in claim 1, said metal being one of a class consisting of nickel, iron and cobalt.

4. A method as claimed in claim 2, said metal being nickel.

5. A method as claimed in claim 4, said conversion of the chloride being done by the application of a solution of a sulphide of the class consisting of sodium, potassium and ammonium sulphides.

6. A method as claimed in claim 2, said aqueous solution including a significant amount of an alcohol having a boiling point lower than 100° C.

7. A method as claimed in claim 1, and subsequently spraying finely divided molten metal on the faces of the coated material.

References Cited

UNITED STATES PATENTS

| | | | |
|---|---|---|---|
| 2,454,610 | 11/1948 | Narcus | 117—47 |
| 2,474,502 | 6/1949 | Suchy | 204—20 |
| 2,965,551 | 12/1960 | Richaud | 204—32 |
| 3,117,034 | 1/1964 | Tirrell | 136—86 |
| 3,122,449 | 2/1964 | Swanson | 117—213 |
| 3,228,797 | 1/1966 | Brown et al. | 136—86 |
| 3,235,473 | 2/1966 | Le Duc | 204—30 |
| 3,179,575 | 4/1965 | Dippel et al. | 204—38 |

FOREIGN PATENTS

| | | |
|---|---|---|
| 196,063 | 1923 | Great Britain. |
| 430 | 1901 | Great Britain. |

JOHN H. MACK, Primary Examiner

W. V. VANSISE, Assistant Examiner

U.S. Cl. X.R.

117—47; 136—120; 204—20, 22, 38